Figure 2:
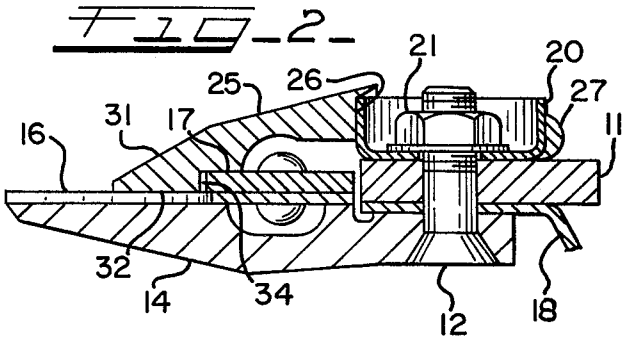
Figure 3:
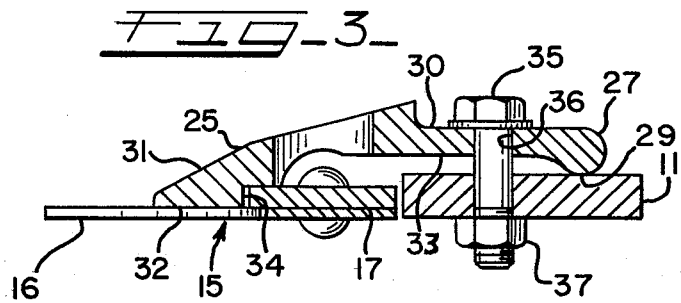
Figure 1:
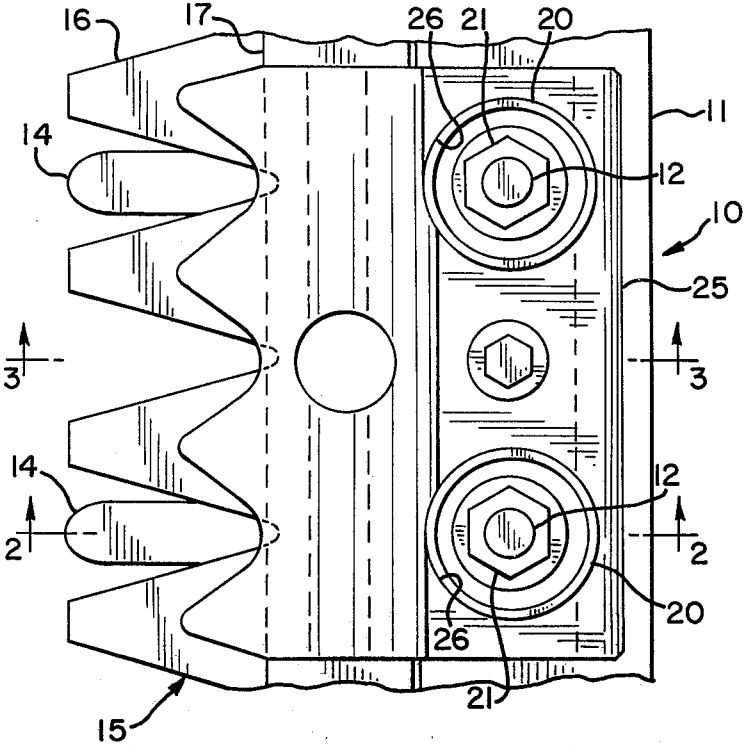

United States Defensive Publication [19] (H) [11] T104,302

Johnson et al. [43] Jun. 5, 1984

[54] CUTTING APPARATUS AND ADJUSTABLE HOLD DOWN THEREFOR

[76] Inventors: Orlin W. Johnson, 578 30th Ave.; Richard E. Benson, 397 33rd Ct., both of East Moline, Ill. 61244; Dathan R. Kerber, 2347 Hawthorne Ct., Bettendorf, Iowa 52722

[21] Appl. No.: 402,187

[22] Filed: Jul. 26, 1982

Related U.S. Application Data

[63] Continuation of Ser. No. 244,355, Mar. 16, 1981.

[51] Int. Cl.[3] ..... A01D 55/06; A01D 55/08

[52] U.S. Cl. ..... 56/305; 56/298

[57] ABSTRACT

A crop cutting apparatus having an elongated cutterbar, a plurality of guards, and reciprocating knife disposed in the usual arrangement wherein cylindrical cup-like retainer members are mounted by the guard mounting bolts to the top side of the cutterbar. A hold down clip slips over the retainer members and has a rearward portion contacting the cutterbar, a medial portion displaced from the cutterbar, and a forward portion including a horizontal surface acting against the knife and a vertical surface acting against the front side of the knife back. A single tie down bolt disposed between the retainer cups adjustably hold the clip in position to resist upward movements of the knife assembly.

1 Claim, 1 Sheet Drawing,

9 Pages Specification

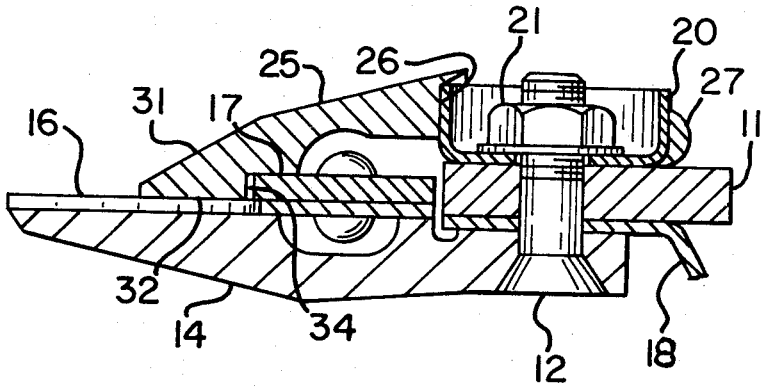

The file of this unexamined application may be inspected and copies thereof may be purchased (849 O.G. 1221, Apr. 9, 1968).